Nov. 7, 1933.    W. L. McGRATH ET AL    1,933,990
SUPERCHARGER CONTROL
Filed May 20, 1932
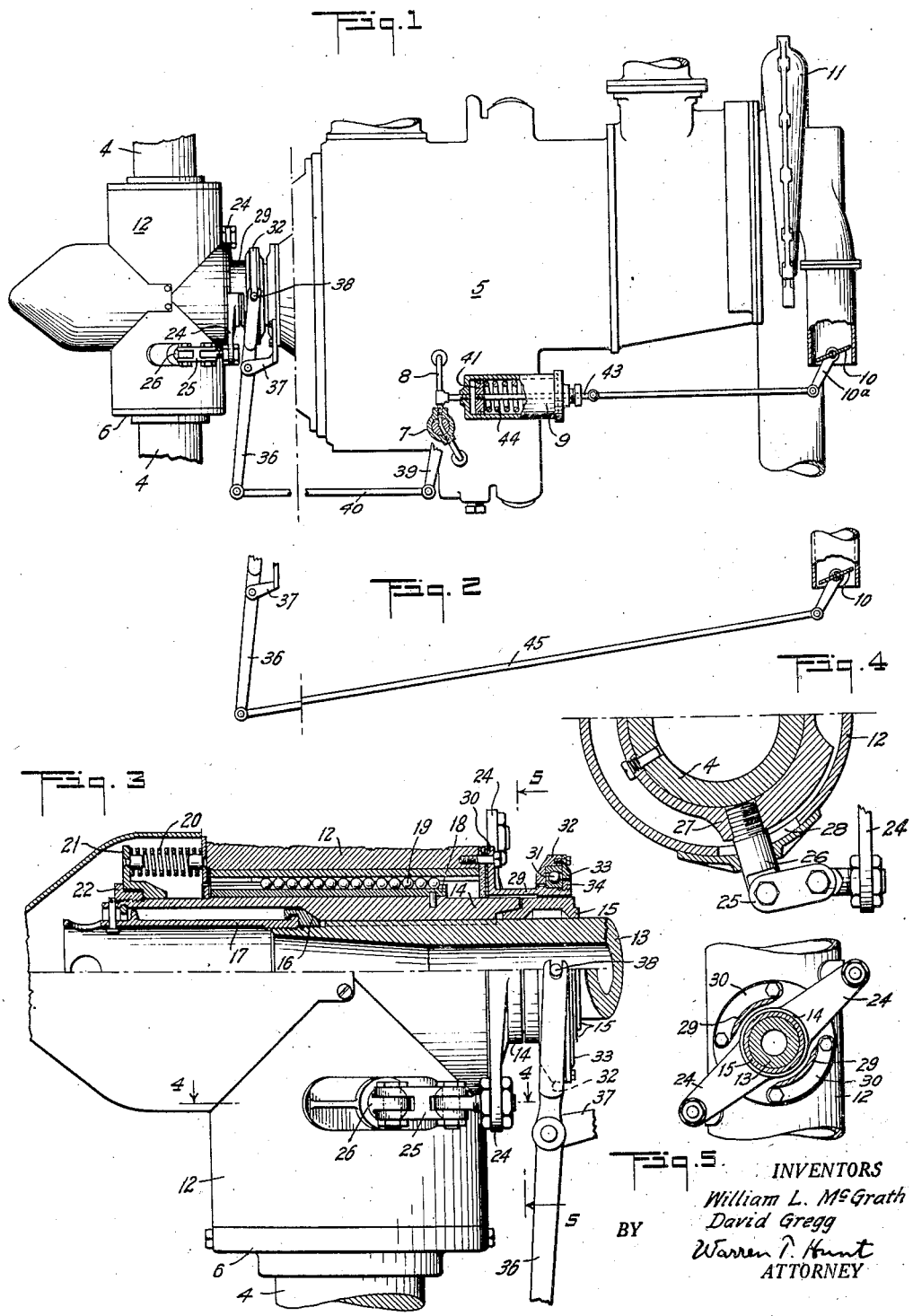
INVENTORS
William L. McGrath
David Gregg
BY Warren T. Hunt
ATTORNEY Patented Nov. 7, 1933

1,933,990

UNITED STATES PATENT OFFICE 1,933,990

SUPERCHARGER CONTROL

William L. McGrath, Elmira, N. Y., and David Gregg, Caldwell, N. J., assignors, by mesne assignments, to Eclipse Aviation Corporation, East Orange, N. J., a corporation of New Jersey Application May 20, 1932. Serial No. 612,580

15 Claims. (Cl. 244—25)

This invention relates to internal combustion engines, and more particularly to control mechanism for charge-forming accessories on aircraft engines.

One of the objects of the present invention is to provide novel means for controlling the supercharging of aircraft engines.

It has heretofore been proposed to provide barometric controls for superchargers whereby the supercharger tends to prevent loss of engine power with increase of altitude but such a control prevents any appreciable amount of supercharging at the lower altitudes and hence the operative cannot obtain the increased power from the engine resulting from supercharging at such lower altitudes. In order to secure maximum operating characteristics, however, the supercharging should be varied in accordance with the load to be placed on the engine.

It is, therefore, another object of this invention to provide a simple and efficient mechanism for controlling the supercharging of an aircraft engine in accordance with the load placed thereon.

Still another object is to provide novel supercharger control mechanism whereby the supercharger is controlled in accordance with the pitch angle of a variable pitch propeller.

A further object is to provide novel mechanism whereby the varying thrust upon a propeller may be utilized for controlling charge-forming devices mounted upon an aircraft engine.

A still further object is to provide novel means for controlling the quantity of explosive mixture entering an aircraft engine in accordance with the load placed upon the same.

The above and further objects and novel features of this invention will more fully appear from the following description when taken in connection with the accompanying drawing. It is to be expressly understood, however, that the drawing is for the purposes of illustration only and is not designed as a definition of the limits of the invention reference being had for this purpose to the appended claims.

In the drawing wherein like reference characters refer to like parts throughout the several views:

Fig. 1 is a side elevation view, partly in section and with parts broken away, of a device embodying the present invention;

Fig. 2 is a detail view showing a portion of the mechanism of Fig. 1 in modified form;

Fig. 3 is a fragmentary side elevation view on an enlarged scale and partly in section;

Fig. 4 is a partial sectional plan view taken on line 4—4 of Fig. 3; and

Fig. 5 is a reduced scale, transverse sectional view on line 5—5 of Fig. 3.

One form of the control mechanism involving the present invention is illustrated in the accompanying drawing, by way of example, as an automatic supercharger control for aircraft engines. Referring to Fig. 1, such control mechanism is shown mounted on an aircraft engine 5 upon which is mounted an axially movable variable pitch propeller 6 that is adapted to actuate a valve 7 in a suitable pressure line 8, thereby controlling the pressure in a cylinder 9 and hence the position of inlet valve 10 of an engine-driven supercharger 11.

For carrying out the present invention, any suitable type of variable pitch propeller, the specific construction of which per se constitutes no part of the present invention, may be utilized. As a preferred embodiment, however, an axially movable propeller 6 has been chosen because of its particular adaptation and its simplicity of operation. In the form shown, propeller 6 comprises a hub portion 12 adapted to be drivably mounted on a crank shaft extension 13 of engine 5, and further adapted to rotatably receive the root ends of a plurality of propeller blades 4.

A driving connection is provided between the propeller hub 12 and shaft 13 comprising a driving member 14 interposed between said hub and shaft and drivably connected to the latter by any suitable means such as splines. Member 14 is maintained on shaft 13 and is held from moving axially relative thereto by means of a sleeve 15 suitably secured to the inner portion of shaft 13, and by a split ring 16 which may be held firmly against member 14 by means of a supporting cylinder 17 which is threadedly received by the outer end of shaft 13. Surrounding the mid-portion of member 14, and suitably keyed thereto, is a bearing sleeve 18 which is provided with a plurality of annularly spaced longitudinal grooves of substantially semi-circular cross-section on its outer periphery. These grooves are adapted to receive a plurality of roller bearings 19, the upper portions of which extend into corresponding grooves in the inner surface of hub 12, thereby forming a driving connection between said hub and driving member 13 while permitting relative axial movement therebetween in response to thrust acting on the blades 4 during operation. Axial movement of hub 12 on shaft 13 is yieldingly resisted by an annular series of coil springs 20 suitably interposed between a stationary ring 21 and the forward surface of hub 12. The entire propeller assembly is maintained on shaft 13 by means of a nut 22.

The illustrated means for varying the pitch of the propeller blades in accordance with the axial movements of the propeller is constituted by a pair of diametrically opposed ears 24 formed integrally with driving member 14 and connected by a simple linkage, such as links 25 and arms 26 to the root portions of blades 4. The members 26 are secured to torsion compensating weights 27 attached to the root ends of blades 4, and extend outwardly through suitable openings 28 in the hub 12. The outer ends of said arms 26 are operatively connected to ears 24 by means of links 25.

It will be seen that during any axial movement of the propeller against the tension of springs 20, the ears 24 will remain stationary and be effective, through members 25, 26, to rotate blades 4 about their longitudinal axes, thereby varying the pitch of the same. Propeller 6 is so constructed that blades 4 will be at their maximum pitch when hub 12 is in its innermost position, to the right as shown in Fig. 1, the pitch gradually decreasing as the hub moves outwardly, to the left.

The present invention embodies novel means for transmitting the longitudinal movement of the propeller mechanism to a valve or other suitable device on, or adjacent to, the engine. In the preferred embodiment of the invention, such novel means comprises a cylinder 29 slidably mounted upon sleeve 15. As shown, the forward portion of said cylinder is partially cut away, and is provided with a flange 30 attached to hub 12 by means such as screws.

Surrounding the inner portion of cylinder 29, and rotatably mounted thereon by means of roller bearing 31 is an internally flanged ring 32. The bearing 31 and ring 32 may be held in desired position on cylinder 29 by any suitable means such as rings 33 and nut 34 so that ring 32 is constrained to move axially with propeller 6 but may be held from rotary movement therewith.

Any suitable means may be provided for transmitting the axial movement of ring 32 to the control mechanism, one form of which will be hereinafter described. Preferably, a simple mechanical linkage is provided consisting of a lever 36 pivoted on a bracket 37 secured to the engine crank case. The upper end of lever 36 may be forked for receiving the lug 38 projecting from ring 32, and a suitable linkage arrangement is actuated from the lower end of said lever.

Novel means are provided whereby the supply of air for the engine is automatically controlled in accordance with the varying load placed upon said engine, thereby controlling the quantity of explosive charge entering the engine cylinders in accordance with the load. As shown, such means are constituted by a valve 7 inserted in oil pressure line 8 of engine 5. The pressure on the inlet side of valve 7 is varied by varying the opening of said valve, the latter being accomplished by operatively connecting the valve operating arm 39 to lever 36 by means of link 40. A pressure-responsive device such as, for example, a piston 41 mounted in a cylinder 9 is in constant communication with pressure line 8 ahead of valve 7 where it may be subjected to said varying pressures. Piston 41 is provided with a piston rod 43 which is operatively connected to the lever 10a of a butterfly valve 10 which controls the supply of air to supercharger 11, the latter being operatively associated with a carburetor, not shown. Resilient means, such as coil spring 44 in cylinder 9, may be provided for yieldingly resisting the movement of piston 41 in response to pressure in line 8. Preferably, spring 44 is just strong enough to balance the normal oil pressure acting on piston 41 when valve 7 is in open position, as shown.

It will be noted that the above-described control mechanism is so arranged that the butterfly valve 10 will be held in closed position by means of spring 44 when the blades 4 of the propeller are at a maximum pitch, that is, when hub 12 is in its innermost position, as shown in Fig. 1; and that said valve 10 will be held in open position when the blades are at a minimum pitch, by virtue of the oil pressure acting on piston 41.

The operation is as follows: As the plane is taking off, a large load is placed upon the engine and there is consequently a large thrust on the propeller blades 4 which is effective to move hub 12 to the left in Fig. 1, whereby the pitch of the blades is decreased and the take-off power of propeller 6 is increased. As hub 12 moves to the left, it carries ring 32 to the left with it, and the latter is thereby effective, through lug 38, to rotate lever 36 about its pivot, the lower end of said lever moving to the right. The valve arm 39 is thus rotated in a counter-clockwise direction to close valve 7 and divert the oil pressure in line 8 to cylinder 9, whereupon the piston 41 is moved to the right, opening valve 10, admitting a maximum supply of air to supercharger 11. It is thus seen that when a large load is placed upon the engine and increased power is required, a larger quantity of explosive charge is forced into the cylinders by the supercharger. As the plane gains altitude and a cruising speed is assumed, the load, and therefore the thrust on the propeller, decreases. Springs 20 are now effective to move hub 12 to the right, maintaining the blades at their most effective pitch angle for the instantaneous load conditions. As the hub 12 is thus moved to the right, lever 36 is rocked in a clockwise direction and is effective to open valve 7 in proportion to the movement of hub 12, which movement is in turn proportionate to the thrust acting upon the propeller 6. As valve 7 is thus gradually opened, the pressure on piston 41 will be proportionately decreased and spring 44 will become effective to move said piston to the left, tending to close valve 10 to reduce the air to supercharger 11.

A direct connection between lever 36 and butterfly valve 10 may be provided as illustrated in Fig. 2, wherein the lower end of lever 36 is directly connected to the operating handle of valve 10 by means of link 45. By this arrangement, the movements of the control mechanism vary in direct proportion to the thrust upon the propeller.

There is thus provided novel means for transmitting the thrust energy of a rapidly rotating propeller to a control member, and novel means for converting this energy into useful work in the operation and control of charge forming apparatus on the plane. By employing means responsive to the thrust of a propeller during operation for controlling a supercharger, it will be readily seen that novel means have thus been provided for regulating the quantity of the mixture entering the engine in accordance with the operating conditions of the motor, hence materially increasing the operating characteristics thereof.

While there has been shown and described only two embodiments of the invention, it is to be expressly understood that the same is not limited thereto but may be embodied in various mechanical forms. For example, it is to be understood that fluid pressure means may be substituted for the mechanical linkage illustrated for transmitting the axial movements of a propeller, and that cam mechanism or irregular valve ports may be provided in order that the movements of the control mechanism may be made to vary in any given manner relative to the thrust of the propeller. Various changes, other than those mentioned above, may also be made in the arrangement illustrated without departing from the spirit of the invention as will now be apparent to those skilled in the art. Reference will primarily be had, therefore, to the appended claims for a definition of the limits of the invention.

What is claimed is:

1. In combination with an internal combustion engine having a power shaft, a propeller having a hub mounted for axial movement on said shaft, a supercharger for said engine, an air supply valve for said supercharger, and means operatively connected to said valve and hub for opening and closing said valve in accordance with the axial movement of said hub.

2. In combination with an internal combustion engine having a power shaft, a propeller having a hub mounted for axial movement on said shaft, a supercharger for said engine, an air supply valve for said supercharger, a lever adapted to be actuated in response to the axial movements of said propeller, an operating arm on said valve, and a link for operatively connecting said lever and arm.

3. In combination with an internal combustion engine having a power shaft, a propeller having a hub mounted for axial movement on said shaft, a supercharger for said engine, an air supply valve for said supercharger, a pressure system, a cylinder in communication with said system, a piston in said cylinder operatively connected to said valve, valve means for controlling the pressure in said cylinder, and means for operatively connecting said last-named means to said propeller.

4. The combination with an aircraft engine of a supercharger, an axially movable variable pitch propeller, and means actuated by axial movement of said propeller for controlling the intake valve of said supercharger.

5. The combination with an internal combustion engine of a variable pitch propeller adapted to move axially of its axis of rotation, and valve means controlled by said propeller, said valve means being effective to control the quantity of explosive mixture delivered to said engine.

6. The combination with an internal combustion engine of a supercharger, a variable pitch propeller, and means including a linkage operatively connected to the propeller for increasing the intake opening to said supercharger in accordance with a decrease in pitch of said propeller.

7. The combination with an internal combustion engine of a variable pitch propeller, a supercharger, a source of fluid pressure, pressure responsive means for controlling the intake opening to said supercharger, and means actuated by said propeller for controlling the application of pressure to said first-named means.

8. The combination with an aircraft engine of a variable pitch propeller, a supercharger, an intake valve for said supercharger, a pressure responsive element for actuating said valve, a valve for varying the effective pressure on said element, and means actuated by said propeller for operating said last named valve.

9. The combination with an internal combustion engine of a pressure system, a valve in said system, a variable pitch propeller having a movable hub, and means including a linkage operatively connected to the propeller hub and valve whereby the pitch changing movement of said propeller is effective to operate said valve.

10. The combination with an internal combustion engine of a variable pitch propeller capable of axial movement relative thereto, valve mechanism associated with said engine, and means operatively connected to said valve mechanism and propeller for actuating the former in response to the axial movement of said propeller.

11. The combination with a variable pitch propeller adapted to be mounted on a power shaft and having a hub mounted for longitudinal movement on said shaft, of a ring mounted on said hub and capable of rotary movement relative thereto, and means including a linkage associated with said ring for transmitting axial movements of said hub to a member of an engine upon which said propeller is mounted.

12. The combination with an internal combustion engine having a power shaft, of a variable pitch propeller mounted on said shaft and adapted for axial movement relative thereto, a non-rotating member mounted on said propeller for axial movement therewith, a lever adapted to be actuated by said member during the axial movement thereof, valve means for varying the supply of air to a supercharger, and means operatively connecting said valve means and lever for actuating the former.

13. The combination with an internal combustion engine of a variable pitch propeller, a supercharger for the engine, a valve for varying the supply of air to said supercharger, means including a linkage for actuating said valve, and means for operatively connecting said first-named means to said propeller, said linkage being arranged to hold said valve in open position during large propeller thrust and to gradually close the valve as said thrust decreases.

14. The combination with an internal combustion engine of a variable pitch propeller, a supercharger, valve means for varying the supply of air to said supercharger, and means for controlling said first-named means including a pressure-responsive element, valve means for varying the pressure on said element, and means including a linkage for transmitting pitch-varying movements of said propeller to said last-named means.

15. The combination with an aircraft propeller adapted to be mounted upon the crank shaft of an engine and capable of axial movement relative thereto, of a member mounted on the hub portion thereof, said member being capable of rotary movement relative thereto and axial movement therewith, a pivotally mounted lever adapted to be actuated by said member, and means for operatively connecting said member to a control device on said engine.

WILLIAM L. McGRATH.
DAVID GREGG.